(12) United States Patent
Suryanarayana et al.

(10) Patent No.: US 12,067,385 B2
(45) Date of Patent: Aug. 20, 2024

(54) CONFIGURING COMPUTE EXPRESS LINK (CXL) ATTRIBUTES FOR BEST KNOWN CONFIGURATION

(71) Applicant: Dell Products L.P., Round Rock, TX (US)

(72) Inventors: Shekar Babu Suryanarayana, Bangalore (IN); Sumanth Vidyadhara, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 78 days.

(21) Appl. No.: 17/875,502

(22) Filed: Jul. 28, 2022

(65) Prior Publication Data

US 2024/0036848 A1 Feb. 1, 2024

(51) Int. Cl.
  *G06F 8/65* (2018.01)
  *G06F 9/4401* (2018.01)
(52) U.S. Cl.
  CPC ............. *G06F 8/65* (2013.01); *G06F 9/4401* (2013.01)
(58) Field of Classification Search
  CPC .......................... G06F 8/60–66; G06F 9/4401
  USPC .................................................. 717/168–178
  See application file for complete search history.

(56) References Cited

U.S. PATENT DOCUMENTS

2021/0240589 A1*  8/2021  Samuel ..................... G06F 8/65
2021/0374056 A1* 12/2021  Malladi .............. G06F 9/30047

OTHER PUBLICATIONS

Bobroff, Zachary, Using Capsules for Firmware Configuration Update, American Megatrends, 2019, 29 pages, [retrieved on Dec. 13, 2023], Retrieved from the Internet: <URL:https://uefi.org/learning_center/presentationsandvideos>.*
Compute Express Link (CXL) Specification Revision 2.0, Oct. 2020, 628 pages, [retrieved on Dec. 13, 2023], Retrieved from the Internet: <URL: https://www.computeexpresslink.org/_files/ugd/0c1418_764cbe0ec41a43d7969d34c81e837c2c.pdf>.*

* cited by examiner

*Primary Examiner* — Geoffrey R St Leger
(74) *Attorney, Agent, or Firm* — Jackson Walker L.L.P.

(57) ABSTRACT

Disclosed methods may push a capsule update including a best known configuration-compute express link (BKC-CXL) firmware update to a boot time memory area. Following a platform reboot, BKC-CXL firmware update operations are performed. The update operations include mapping a BKC-CXL runtime memory area to a non-volatile BKC store, identifying current CXL attributes from the runtime memory area, extracting the firmware update, creating one or more BKC-CXL objects from the firmware update to enable dynamic configuration of CXL parameters, comparing current CXL attributes with stored CXL attributes to identify CXL attribute changes, and saving information indicative of the CXL attribute changes back to the non-volatile BKC store. Following a subsequent reboot, regular boot path operations are performed, including identifying existing CXL attributes indicated in the non-volatile BKC store and responsive to detecting a flag set to apply vendor pushed dynamic CXL attributes, obtaining BKC-CXL recommendations from an ML inference engine.

18 Claims, 3 Drawing Sheets

CONFIGURING COMPUTE EXPRESS LINK (CXL) ATTRIBUTES FOR BEST KNOWN CONFIGURATION

TECHNICAL FIELD

The present disclosure relates to information handling system interconnects and, more specifically, managing the configuration of such interconnects.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be deployed as an edge computing platform. Edge computing includes a pervasive information technology platform model in which information handling resources, including compute, storage, and network resources, are deployed at or near data-generating resources including, without limitation, sensors and other Internet of Things (IoT) resources.

It is not uncommon to implement edge resources in a data center configuration that features a potentially large number of standard hardware devices including, as an example, x86-based rack mount servers. Generally, edge resources of this type are highly configurable and a key issue is how best to configure edge server resources, including firmware and operating system (OS) updates, with minimum downtime.

SUMMARY

The ability to rapidly configure or provision hardware in response to potentially large and/or sudden variations in bandwidth and other metrics can beneficially relieve or eliminate bottlenecks. Composability, and the related concepts of composable resources and composable infrastructure, facilitates efficiencies for networks handling heterogeneous or diverse workloads including, in at least some instances, networks handling high performing workloads and lower performing workloads.

Compute Express Link (CXL) is an open standard for high speed, cache-coherent interconnects between central processing units (CPUs) and memory and peripheral devices. CXL leverages the Peripheral Component Interconnect Express (PCIe) physical layer (PHY) while adding its own higher-layer protocols implementing coherency and other desirable features for emerging applications and solutions.

Industry mega-trends are driving demand for faster data processing and next-generation modern client performance. These demands motivate a new class of interconnect for usages, including heterogeneous computing and disaggregation applications, requiring a dynamic assessment of various system attributes to determine a best known configuration (BKC) after a firmware update with minimum downtime for the end users. A BKC refers to the best known configuration of and the required updates needed for an edge computing resource.

A BKC has multiple desirable characteristics. A BKC enables efficient resource sharing within a complex hardware ecosystem that may include in addition to an operating system (OS), a BootLoader, a boot strap processor (BSP), MutiOS Boot, Cloud, device peripherals, etc. BKCs may also enable enhanced data compute and data analytics results between a host system-on-chip (SOC), OS, and across device accelerators and target devices. BKCs may achieve significant latency reduction to enable disaggregated memory.

Composable infrastructure on an edge resource can be enabled using CXL infrastructure, but firmware and OS support are required. Sustainability strategies may recommend quarterly BKC firmware updates after a product is sold or distributed. Due to changes in BKC on a composable PC, dynamic adaption to tune/train various system attributes like cache, memory, input/output (I/O) path, etc., for faster network, storage and I/O over a CXL reconfigured path to provide optimal performance is not present.

Power and thermal problems may arise post BKC update. CXL Option ROMs may require a dynamic adaption over an Advanced Configuration and Power Interface (ACPI) driver for coherent device attribute table (CDAT) discovery and heterogeneous memory attribute table (HMAT) creation including secondary system description table (SSDT) update with new BKC and option ROM (OPROM) data. BKC updates to an Advanced Configuration and Power Interface (ACPI) namespace and device objects impacts OS and virtual machine (VM) operations as well.

PCIe and CXL security system components need dynamic propagation of Security Protocol and Data Module (SPDM) that is managed by the Distributed Management Task Force (DMTF) due to BKC firmware recommendations.

In accordance with teachings disclosed herein, issues discussed in the preceding remarks may be addressed by a Scalable Platform Configuration Management (SPCM) protocol that enables dynamic configuration of CXL schema, composable PC as I/O or compute (as a service), hardware configuration, partitioning, streaming, etc. Disclosed teachings enable and support a method for dynamic adaption over ACPI driver for CDAT discovery and HMAT creation including SSDT update with new BKC and OPROM data. Disclosed methods may implement a runtime method for a cloud-based BKC machine learning (ML) inference engine for a new class of interconnect with heterogeneous computing and disaggregation usages for OS and VM runtimes. In addition, one or more disclosed BKC security propagation methods seamlessly propagate the SPDM by DMTF for BKC firmware updates.

With the emphasis on composable PC to enhance I/O, streaming, compute, as-a-service, the SCPM enables dynamic re-configuration of various platform attributes both at boot time and OS runtime for a change in BKC firmware. The cloud-based BKC ML inference engine provides a new class of interconnection for heterogeneous compute and disaggregated use cases for OS/VM applications. Security Propagation enables seamless propagation of various platform security attributes of SPDM by DMTF post BKC firmware updates with little if any downtime. The dynamic adaption of ACPI namespace policy provides a seamless power and thermal configuration without a system reboot but with enhanced system performance.

In one aspect, disclosed methods may push a capsule update including a best known configuration-compute express link (BKC-CXL) firmware update to a boot time memory area. Following a platform reboot, BKC-CXL firmware update operations are performed. The update operations include mapping a BKC-CXL runtime memory area to a non-volatile BKC store, identifying current CXL attributes from the runtime memory area, extracting the firmware update, creating one or more BKC-CXL objects from the firmware update to enable dynamic configuration of CXL parameters, comparing current CXL attributes with stored CXL attributes to identify CXL attribute changes, and saving information indicative of the CXL attribute changes back to the non-volatile BKC store. Following a subsequent reboot, regular boot path operations are performed, including identifying existing CXL attributes indicated in the non-volatile BKC store and responsive to detecting a flag set to apply vendor pushed dynamic CXL attributes, obtaining BKC-CXL recommendations from an ML inference engine.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
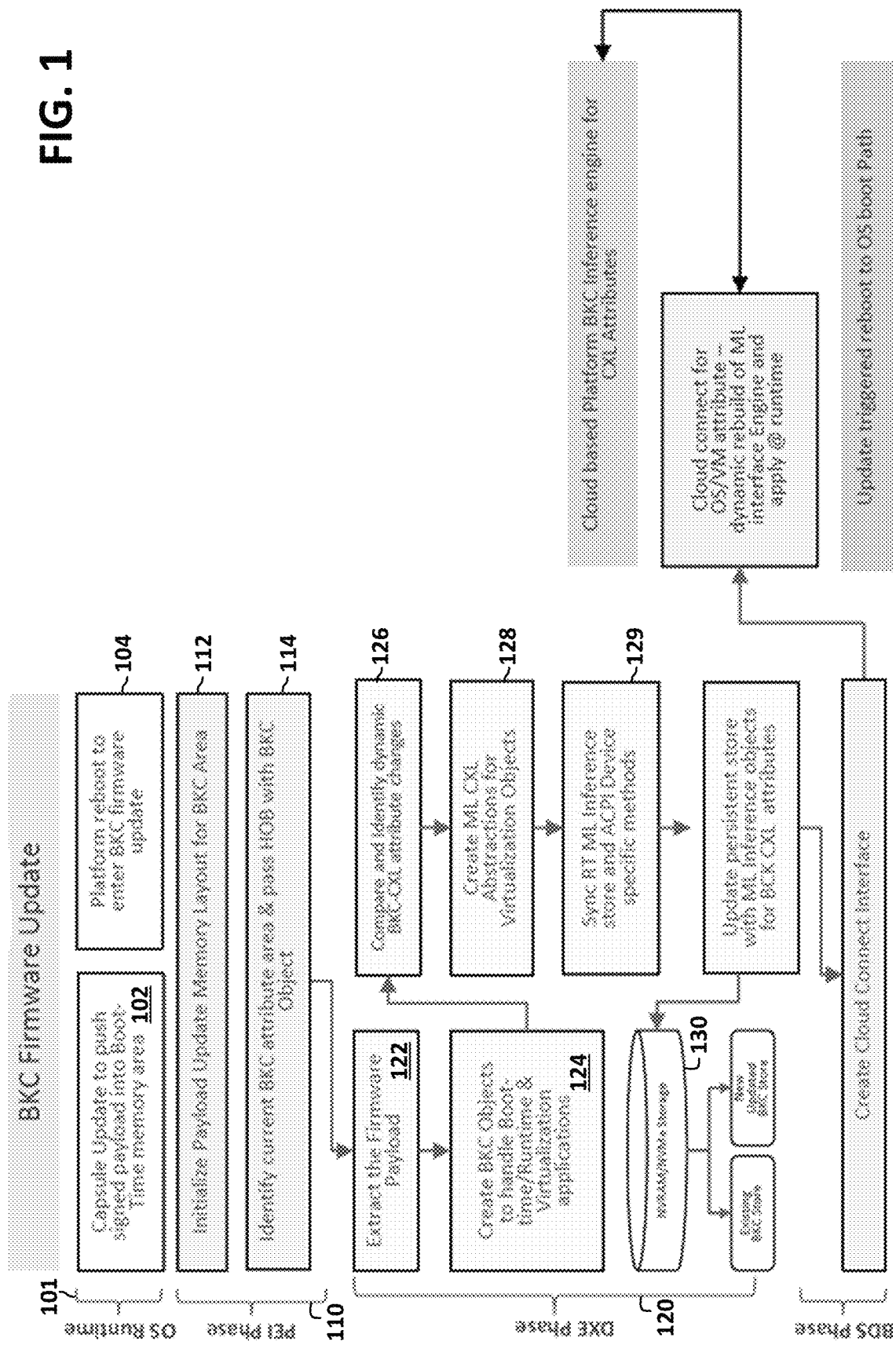
FIG. 1 illustrates a BKC firmware update method in accordance with disclosed teachings.
Figure 2:
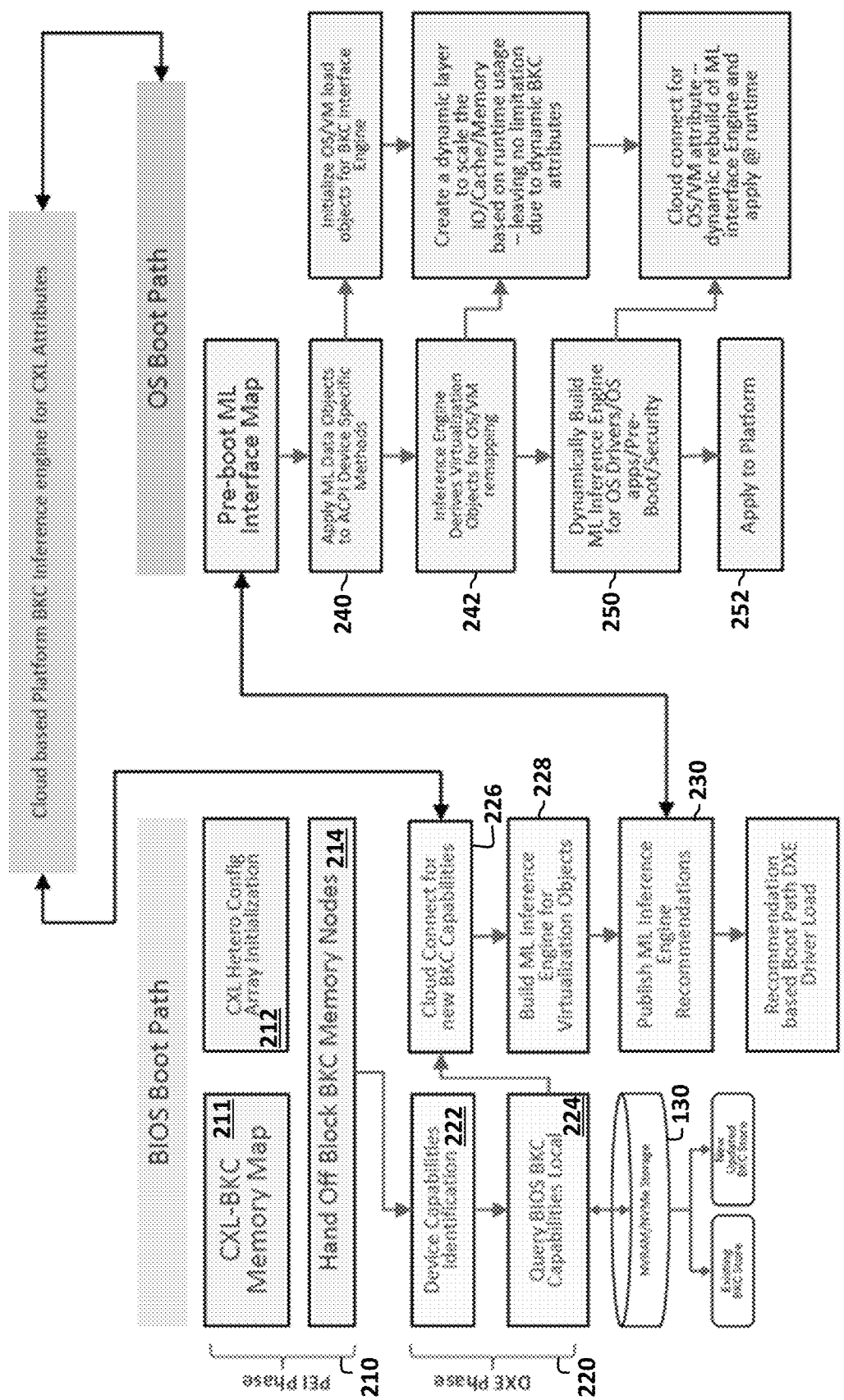
FIG. 2 illustrates exemplary BIOS and OS boot paths in conjunction with a cloud-based BKC inference engine for CXL attributes.
Figure 3:
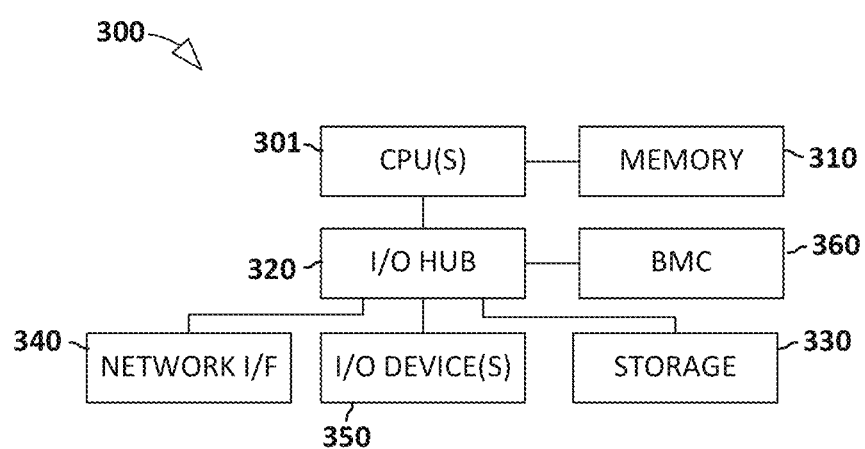
FIG. 3 illustrate an exemplary information handling system suitable for use in conjunction with disclosed subject matter.

Exemplary embodiments and their advantages are best understood by reference to FIGS. 1-3, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates a BKC firmware update solution in which vendor firmware with BKC updates are packaged (102) for a capsule update at OS runtime (101), the signed payload is pushed into capsule update memory area, and the platform reboots (104). In the update triggered reboot path, disclosed intelligence is executed to perform the BKC firmware update providing seamless configurations of CXL modularity objects.

The SPCM is implemented at the PEI phase (110) and gets initialized (112) with a memory layout for dynamic CXL attributes in a dedicated runtime memory area referred to herein as the BKC runtime memory area (BRMA). The BRMA may be mapped to PEI module read handlers into an NVRAM BKC store, and the same area may include a read write handler at DXE phase 120 for OS/Cloud synchronization. The SPCM identifies (114) the current CXL attributes from the BRMA and creates a hand-off block (HOB) that may be passed to the subsequent phases of the UEFI boot.

At the DXE phase (120) illustrated in FIG. 1, the firmware payload is extracted (122) and the extracted payload creates (124) a BKC Object to enable dynamic configuration of CXL schema, Composable PC as IO or Compute (as a service), hardware configuration, partitioning, streaming, etc., at boot time, as well at OS runtime and virtualization environment.

The BKC Object modularity driver may then compare (126) and identify the dynamic BKC-CXL attribute changes and generate (128) ML CXL abstraction APIs for OS runtime virtualization objects.

The runtime ML inference store and ACPI device-specific methods are also created for dynamic adaption over ACPI driver for CDAT discovery and HMAT creation, including SSDT update with new BKC and OPROM data. Once the change attributes are determined for load executions, the same is synced (129) back to NV store (130) with new ML interface objects as depicted in the diagram.

Referring now to FIG. 2, after a BKC firmware update in the regular BIOS boot path, the CXL-BKC memory map (211) is initialized (212) for heterogeneous configuration array and HOB is created (214) for BKC Memory Node in PEI phase (210).

At DXE phase (220) device capabilities are identified (222) and the NV store (130) is queried (224) first to compare the existing attributes and if a cloud flag is set (to apply vendor pushed dynamic CXL attributes) then cloud connect happens (226) for BKC inference engine attributes. The ML inference engine builds (228) the virtualization objects and publishes (230) the ML based BKC-CXL recommendations that need to be adopted dynamically both at boot time as well OS runtime/virtualization environment. The OS boot path applies (240) ML data objects to the ACPI device specific methods and ML inference engine derives (242) the virtualization objects which are remapped to ACPI runtime memory. An ML inference engine is dynamically built (250) for operating system drivers, operating system apps, preboot, security etc. and applied (252) to the platform.

Referring now to FIG. 3, any one or more of the elements illustrated in FIG. 1 through FIG. 2 may be implemented as or within an information handling system exemplified by the information handling system 300 illustrated in FIG. 3. The illustrated information handling system includes one or more general purpose processors or central processing units (CPUs) 301 communicatively coupled to a memory resource 310 and to an input/output hub 320 to which various I/O resources and/or components are communicatively coupled. The I/O resources explicitly depicted in FIG. 3 include a network interface 340, commonly referred to as a NIC (network interface card), storage resources 330, and additional I/O devices, components, or resources 350 including as non-limiting examples, keyboards, mice, displays, printers, speakers, microphones, etc. The illustrated information handling system 300 includes a baseboard management controller (BMC) 360 providing, among other features and services, an out-of-band management resource which may be coupled to a management server (not depicted). In at least some embodiments, BMC 360 may manage information handling system 300 even when information handling system 300 is powered off or powered to a standby state. BMC 360 may include a processor, memory, an out-of-band network interface separate from and physically isolated from an in-band network interface of information handling system 300, and/or other embedded information handling resources. In certain embodiments, BMC 360 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method, comprising:
   pushing a capsule update including a best known configuration-compute express link (BKC-CXL) firmware update payload to a boot time memory area;
   following a platform reboot, performing BKC-CXL firmware update boot operations including:
   mapping a BKC-CXL runtime memory area to a nonvolatile BKC store;
   identifying current CXL attributes from the BKC-CXL runtime memory area;
   extracting the BKC-CXL firmware update payload;

creating one or more BKC-CXL objects from the BKC-CXL firmware update payload to enable dynamic configuration of one or more CXL parameters;
comparing current CXL attributes with CXL attributes in the BKC-CXL firmware update payload to identify CXL attribute changes; and
saving information indicative of the CXL attribute changes back to the non-volatile BKC store; and
following a subsequent reboot, performing regular boot path operations including:
identifying existing CXL attributes indicated in the non-volatile BKC store; and
responsive to detecting a flag set to apply vendor pushed dynamic CXL attributes, obtaining BKC-CXL recommendations from a machine learning (ML) inference engine.

2. The method of claim 1, wherein the one or more CXL parameters include one or more CXL schema parameters.

3. The method of claim 1, further comprising:
generating a machine learning CXL abstraction application programming interface (API) for operating system (OS) runtime virtualization objects.

4. The method of claim 1, wherein the one or more BKC-CXL objects include one or more of:
a BKC boot-time object for use in conjunction with a boot time application;
a BKC operating system (OS) runtime object for use in conjunction with an OS runtime application;
a BKC virtualization object for use in conjunction with a virtualized application.

5. The method of claim 1, further comprising:
creating an Advanced Configuration and Power Interface (ACPI) device-specific method for dynamic adaption over an ACPI driver to enable coherent device attribute table (CDAT) discovery and heterogeneous memory attribute (HMAT) creation.

6. The method of claim 5, further comprising:
including secondary system description table (SSDT) updates with new BKC and option ROM (OPROM) data.

7. An information handling system, comprising:
a central processing unit (CPU); and
a computer readable memory including processor executable program instructions that, when executed by the CPU, cause the CPU to perform operations including:
pushing a capsule update including a best known configuration-compute express link (BKC-CXL) firmware update payload to a boot time memory area;
following a platform reboot, performing BKC-CXL firmware update boot operations including:
mapping a BKC-CXL runtime memory area to a non-volatile BKC store;
identifying current CXL attributes from the BKC-CXL runtime memory area;
extracting the BKC-CXL firmware update payload;
creating one or more BKC-CXL objects from the BKC-CXL firmware update payload to enable dynamic configuration of one or more CXL parameters;
comparing current CXL attributes with CXL attributes in the BKC-CXL firmware update payload to identify CXL attribute changes; and
saving information indicative of the CXL attribute changes back to the non-volatile BKC store; and following a subsequent reboot, performing regular boot path operations including:
identifying existing CXL attributes indicated in the non-volatile BKC store; and
responsive to detecting a flag set to apply vendor pushed dynamic CXL attributes, obtaining BKC-CXL recommendations from a machine learning (ML) inference engine.

8. The information handling system of claim 7, wherein the one or more CXL parameters include one or more CXL schema parameters.

9. The information handling system of claim 7, wherein the operations further include:
generating a machine learning CXL abstraction application programming interface (API) for operating system (OS) runtime virtualization objects.

10. The information handling system of claim 7, wherein the one or more BKC-CXL objects include one or more of:
a BKC boot-time object for use in conjunction with a boot time application;
a BKC operating system (OS) runtime object for use in conjunction with an OS runtime application;
a BKC virtualization object for use in conjunction with a virtualized application.

11. The information handling system of claim 7, wherein the operations further include:
creating an Advanced Configuration and Power Interface (ACPI) device-specific method for dynamic adaption over an ACPI driver to enable coherent device attribute table (CDAT) discovery and heterogeneous memory attribute (HMAT) creation.

12. The information handling system of claim 11, wherein the operations further include:
including secondary system description table (SSDT) updates with new BKC and option ROM (OPROM) data.

13. A non-transitory computer readable medium including processor executable instructions that, when executed by a processor of an information handling system, cause the information handling system to perform operations, comprising:
pushing a capsule update including a best known configuration-compute express link (BKC-CXL) firmware update payload to a boot time memory area;
following a platform reboot, performing BKC-CXL firmware update boot operations including:
mapping a BKC-CXL runtime memory area to a non-volatile BKC store;
identifying current CXL attributes from the BKC-CXL runtime memory area;
extracting the BKC-CXL firmware update payload;
creating one or more BKC-CXL objects from the BKC-CXL firmware update payload to enable dynamic configuration of one or more CXL parameters;
comparing current CXL attributes with CXL attributes in the BKC-CXL firmware update payload to identify CXL attribute changes; and
saving information indicative of the CXL attribute changes back to the non-volatile BKC store; and
following a subsequent reboot, performing regular boot path operations including:
identifying existing CXL attributes indicated in the non-volatile BKC store; and responsive to detecting a flag set to apply vendor pushed dynamic CXL attributes, obtaining BKC-CXL recommendations from a machine learning (ML) inference engine.

14. The non-transitory computer readable medium of claim 13, wherein the one or more CXL parameters include one or more CXL schema parameters.

15. The non-transitory computer readable medium of claim 13, wherein the operations further include:
generating a machine learning CXL abstraction application programming interface (API) for operating system (OS) runtime virtualization objects.

16. The non-transitory computer readable medium of claim 13, wherein the one or more BKC-CXL objects include one or more of:
a BKC boot-time object for use in conjunction with a boot time application;
a BKC operating system (OS) runtime object for use in conjunction with an OS runtime application;
a BKC virtualization object for use in conjunction with a virtualized application.

17. The non-transitory computer readable medium of claim 13, wherein the operations further include:
creating an Advanced Configuration and Power Interface (ACPI) device-specific method for dynamic adaption over an ACPI driver to enable coherent device attribute table (CDAT) discovery and heterogeneous memory attribute (HMAT) creation.

18. The non-transitory computer readable medium of claim 17, wherein the operations further include:
including secondary system description table (SSDT) updates with new BKC and option ROM (OPROM) data.

* * * * *